United States Patent [19]

Floyd

[11] 4,301,669

[45] Nov. 24, 1981

[54] TWO ANTI-THEFT LOCKS

[76] Inventor: Herbert R. Floyd, 420 E. 105th St., New York, N.Y. 10029

[21] Appl. No.: 61,704

[22] Filed: Jul. 31, 1979

[51] Int. Cl.³ .............................................. E05B 17/14
[52] U.S. Cl. ...................................................... 70/428
[58] Field of Search ................ 70/428, 427, 424, 423, 70/14, 237, 163, 166, 167, 168, 169, DIG. 56, DIG. 58

[56] References Cited

U.S. PATENT DOCUMENTS 3,866,445  2/1975  Erwin ..................................... 70/428
4,123,924  11/1978  Dworkis .............................. 70/428

Primary Examiner—Robert L. Wolfe

[57] ABSTRACT

Disclosed are two anti-theft locks for preventing access to the ignition switch which is mounted on the steering column of most conventional automobiles. The said locks include a housing, one end of which is shaped to adapt to the outline of a steering column, and one of the said locks further includes an anti-pick lock device thereupon, moreover the said locks include a pair of movable arms therein, which is coupled to a movable element mounted within the housing and means for selectively controlling a pair of movable latches which may be shifted simultaneously in an impenetrable clutching posture with and locked around the rotatable portion of the ignition switch. At the position specified the device would be fitted over and secured to the steering column.

3 Claims, 8 Drawing Figures

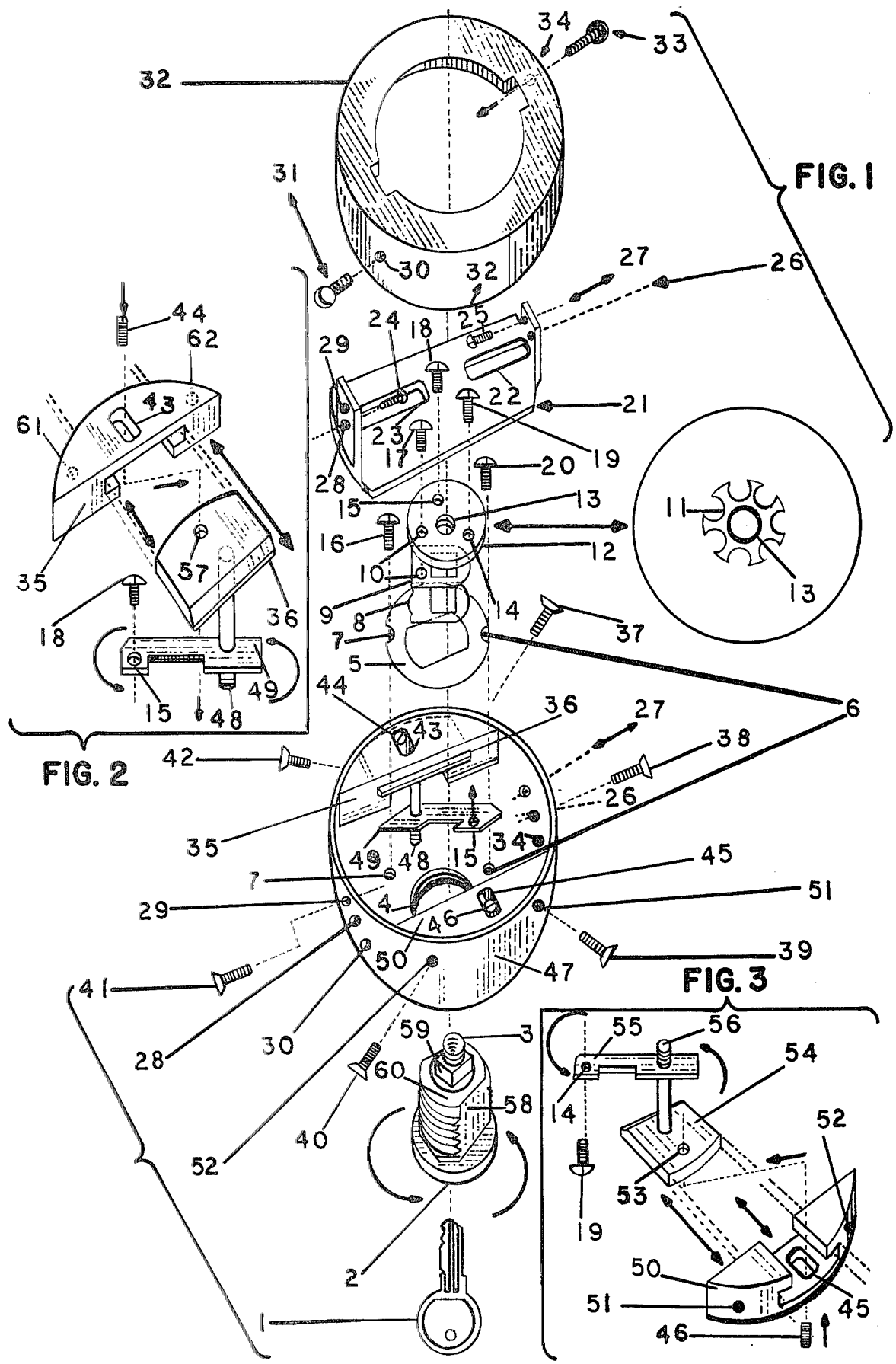

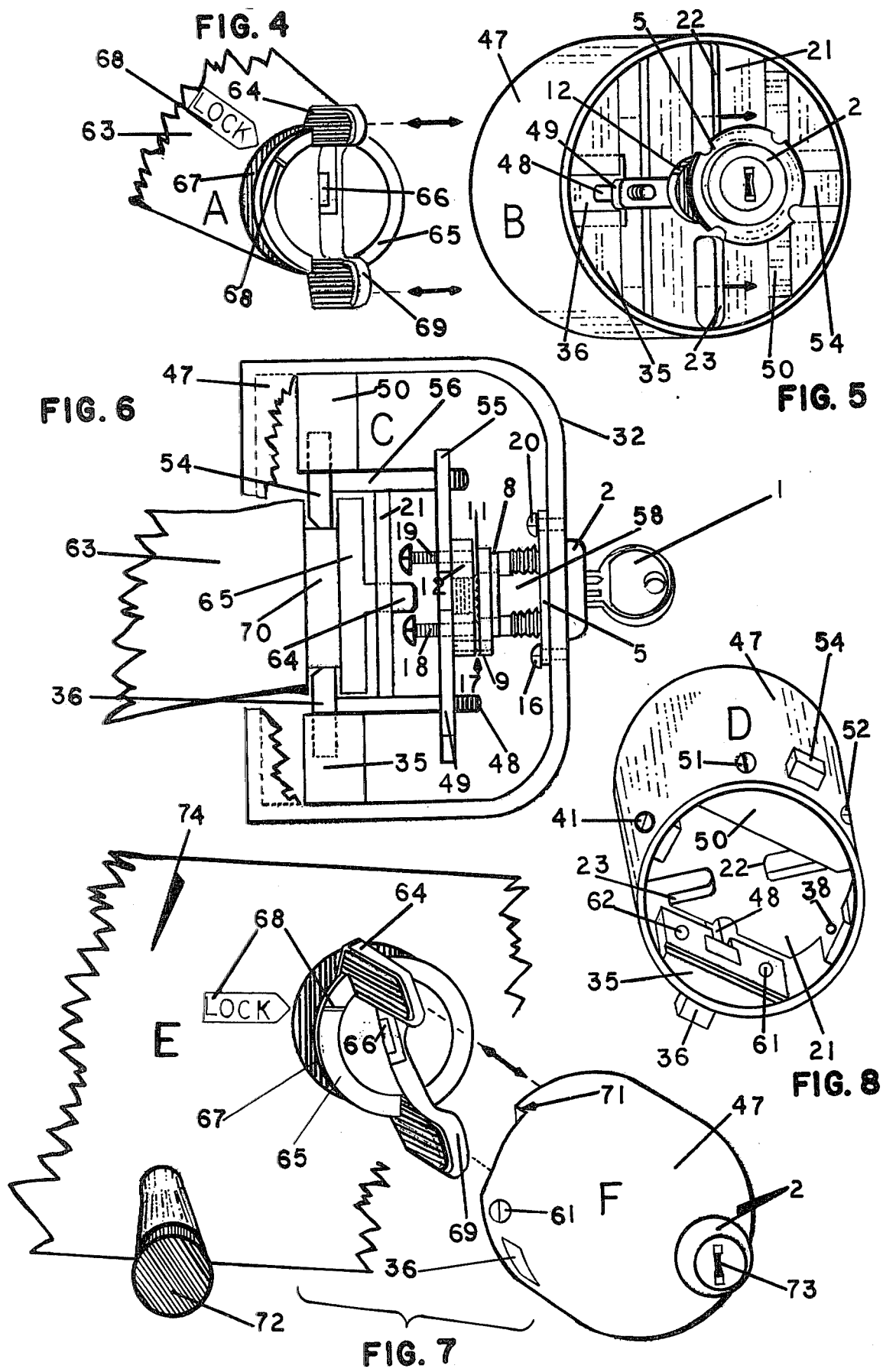

TWO ANTI-THEFT LOCKS

This invention relates to automobiles, and specifically to an improved ignition switch lock which is mounted on the steering column of most domestic automobiles to control access to the ignition switch lock.

In recent years most automobile manufacturers have begun to include a steering column mounted automobile ignition switch lock which is linked to a locking mechanism for the automobile's transmission and for the steering column to prevent theft and or otherwise unauthorized movement of the vehicle when the ignition is in the off or locked position. The very nature of the lock structure permits easy dislodgement of the mechanisms so that the removal thereof by forcing a screw into the keyhole of the ignition switch is feasible.

Heretofore, automobile ignition switch lock mechanisms had conventional padlocks, and consequently were easily removable by means of a cutting device such as a lock cutter. An example of such prior art auxiliary devices may be found in U.S. Pat. No. 3,811,303 and U.S. Pat. No. 3,665,738. Both of these devices completely encircles the steering column in the vicinity of the ignition switch.

It is therefore the principal object of this invention to provide an improved steering wheel lock mechanism which is relatively simple in design, highly resistive to picking and yet inexpensive and easy to apply to the steering wheel and may only be removed by an authorized user of the automobile. Morever, this invention is completely interchangeable from automobile to automobile. Another object of this invention is to provide an ignition switch lock which is highly resistive to damage or destruction, and when placed over the ignition switch of an automobile, and locked" in place by use of a separate key is a fact.

A still further object of my invention is to provide an ignition switch lock which continues to function below zero, with regard to the temperature, and harmful atmospheric conditions.

Briefly, in accordance with the principles of this invention, an anti-theft lock which is shaped to conform to the mold of the conventional steering column ignition switch is provided with means for engaging the rotatable portion of the ignition switch assembly.

The engaging means preferably includes a pair of latches or clamps which are shifted simultaneously in an impenetrable clutching posture when they are in the locked position, however, the pair of clamps are reciprocable between locked and unlocked positions.

The device is further provided with a pair of movable arms which is coupled to a movable element mounted within the housing and means for selectively controlling the pair of movable latches.

It is therefore a feature of an embodiment of this invention that an anti-pick device which is moved along in constant frictional contact with the external surface on one of the anti-theft locks, which is enclosed around and secured to the security device in an impenetrable clutching position.

Still another feature of an embodiment of this invention is that the anti-pick lock device is also shaped to adapt to the contours of a conventional automobile steering column, thereby preventing removal of the device by turning, twisting or picking. Moreover, this invention is completely preassembled, requiring no construction by the user in order to make it possible. Further objects and advantages of my invention will become apparent from a consideration of the drawings and ensuing description thereof.

FIG. 1 shows an exploded view of the assembly, and a conventional key-operated lock which locks and unlocks the device, as shown best in FIG. 6.

FIGS. 2 and 3 show sectionally the lock mechanisms functionally operative in FIG. 6.

FIG. 4 shows a typical steering column-mounted ignition switch lock which extends from the steering column.

FIG. 5 shows a semi top cross-sectional view of the invention, showing the device intermediate between profile and full visage, which is designed to be placed over the ignition switch lock which extends from the steering column shown in FIG. 4, with means for engaging and locking the rotatable portion of the ignition switch assembly as shown in FIG. 6.

FIG. 6 shows a cross-sectional view of the device in an engaging and locking posture with the ignition switch lock which extends from the steering column, preferably comprising a key for the lock and the movable elements;

FIG. 7 shows a typical steering column-mounted ignition switch lock which "doesn't" extend from the steering column, suggesting a conspicuous difference in properties," stressing an unmistakable difference from the ignition switch shown in FIG. 4.

FIG. 8 shows a preassembled view of the anti-theft security device which is designed to be placed over the ignition switch lock which "doesn't" extend from the said steering column shown in FIG. 7, with means for engaging and locking the rotatable portion of the ignition switch assembly. However, the device shown in FIGS. 8 and 9 may be placed over the ignition switch shown in FIG. 4 likewise, with means for engaging and locking, nevertheless, the device shown in FIG. 5 is constructed according to a preferred embodiment of the extended ignition switch lock, shown in FIG. 4, and is further provided with an anti-pick lock device comprising, as shown at the top of the drawing in FIG. 1, exhibiting number (32).

Now describing the invention in particular and describing the various individual parts by reference numbers.

FIG. 1 shows an exploded view of the assembly, with the anti-pick lock 32 at the top ostensively thereof. The casing 21 which is shaped to adapt to the contours of a conventional automobile steering column, thereby preventing removal of the device by twisting or turning. At one end of the housing 47, the casing 21 is mounted between a sliding latch mechanism, 35 and 50 which is illustrated in FIGS. 1, 2 and 3. The pair of movable arms 49 and 55 are attached to a pair of bar shaped elements 48 and 56, one end of which is screwed therein at one end thereof, as shown in FIGS. 2 and 3. The opposite ends of the pair of bar shaped elements 48 and 56 are mounted on the pair of latches 36 and 54 therein, (see FIGS. 2 and 3). The pair of latches 36 and 54, one end of which is shaped to conform to the contours of a pair of hollowed out elements 35 and 50 which is mounted within the housing 47 thereof, ostensively serving as a mechanism comprising a pair of movable arms which is coupled to a disk-shaped element 12 which is movable when it is joined to a screw shaped element 3 which is movable whenever the key 1 is inserted into the key-way 73 (see FIG. 9). The conventional key-operated lock 58 is mounted within the housing 47 by way of aperture 4 which is cut and designed to conform to the contours of the threaded grooves around the outside surface with an advancing spiral ridge underneath the flat surface at the top 60 thereon the conventional key-operated lock 58, and means for selectively controlling the pair of movable latches 36 and 54 which may be simultaneously shifted in an impenetrable clutching posture with and locked around the rotatable portion of the ignition switch 70, which is located in the spaced 67 extending between the extended portion of the steering column-mounted ignition switch 63, and the disk-shaped element 65, (see FIG. 4). The ignition switch do not extend from the steering column 74 as shown in FIG. 7. However the rotatable portion of the ignition switch is obscure in the rear of the disk-shaped element 65, as shown in FIG. 7.

The disk-shaped element 5 which is equipped with an aperture shaped to conform to the contours of the conventional key-operated lock 58 is seated on the surface around the aperture 4 and mounted on the surface within the housing thereof, this may be made possible after the key-operated lock 58 has been properly oriented, (see FIGS. 1 and 6). The element 8 is seated on the surfaces 60, and the element 9 is seated on the element 8, and enclosed around the four cornered element 59, (see FIGS. 1 and 6 of the drawings). The seven pronged element 11 which shows an aperture 13 is seated on the surface 59, enclosed around the screw shaped element 3 thereby permitting disk-shaped element 12 to be properly oriented, (see FIGS. 1 and 6). The screw element 17 serves as a stabilizer when it is properly oriented in apertures 10 of the disk-shaped element 12 and of the element 9 shown in FIGS. 1 and 6. FIG. 6 shows a portion of an ignition switch lock 70 as it is typically mounted on the steering column 74. (see FIG. 7). The ignition switch lock 70 includes a disk-shaped element 65 having a pair of protruding elements 64 and 69 extending therefrom and a central ignition-key-way 66.

The rotatably mounted ignition switch lock 70 cannot be rotated when it is in a locked position as shown with the ignition key removed. In this position the steering mechanism is also locked. Insertion of the ignition key through the key-way 66 and into the ignition switch lock 70 unlocks the lock and permits rotation thereof. Rotation of the lock 70 into an on" position unlocks the steering mechanism and turns on the electrical system. Further rotation of the lock 70 starts the engine. The pair of protruding elements 64 and 69 are allowed to pass through the midst of the apertures 22 and 23 of the casing 21 as it is placed over the ignition switch lock 70, (see FIGS. 1, 4, 6, and 7. Insertion of the anti-theft key 1 through the key-way 73 and into the conventional lock 58 will join forces with the disk-shaped element 12 whenever the key 1 is turned. The disk-shaped element 12 will rotate whenever the key 1 is inserted and turned in the lock 58, causing the pair of arms 49 and 55 to move simultaneously, consequently taking the pair of latches 36 and 54 on a journey forward, directionally to the ignition switch lock 70, in an impenetrable clutching and locking posture. The engaging means preferably includes a pair of bar-shaped elements 48 and 56, which is mounted at one end of the pair of latches 36 and 54, having the opposite end properly oriented to the pair of arms 49 and 55, (see FIG. 6).

Having described the invention with certain particularities and likewise being aware that the invention comprises additional embodiments not particularly shown or described, but that those embodiments herein preferably described are for the purpose of all encompassing those other embodiments not so particularly described. FIG. 1 shows an exploded view of the protective device with the various parts and how they integrate into a complete assembly as shown by the other drawings in the case to form an anti-theft ignition lock security device.

Having described the invention what is claimed is:

1. Two anti-theft locks for providing authorized access to a pair of diversified auto ignition switches mounted on the steering column of a vehicle: said first ignition switch extends from said steering column being substantially cylindrical in shape, however, the said second ignition switch doesn't extend from said steering column, and said both ignition switches having a first axis, and said ignition switches having a still segment fixed to said steering column and a movable segment rotatable with respect to said stationary segment about a second axis substantially perpendicular to said first axis and spaced from said stationary segment to define an annular hiatus therebetween; said two anti-theft locks comprising
   (a) housing having one end surface shaped to join with and adapt to the mold of the circumference of said steering column coaxially with said second axis,
   (b) means for engaging the movable segment of said ignition switch comprising at least one movable bar shaped element having at least one quadrilateral shaped member thereon and adapted to move reciprocally between a locked position in joining engagement with said annular hiatus and an unlocked position out of joining engagement with annular hiatus, and
   (c) means for controlling the reciprocation of said at least one movable bar shaped element between said locked position and said unlocked position comprising
      (i) at least one arm corresponding to and coupled to said at least one movable bar shaped element, said at least one arm having one end surface providing an aperture thereon,
      (ii) shaped to mate with and connect to a rotatable disk-shaped member for movement of said at least one arm,
      (iii) means for guiding said at least one movable bar shaped element from at least one semi-quadrilateral shaped hollowed out member, and
      (iv) means for selectively guiding said at least one movable bar shaped element transposable to said at least one semi-quadrilateral shaped hollowed member therein.

2. Two anti-theft locks in accordance with claim 1 wherein said means for engaging the movable segment of said ignition switch comprises two movable bar shaped parts, and wherein said means for controlling the reciprocation includes two arms, each said arm shaped element corresponding to and coupled to one of said two bar shaped members, wherein one said ignition switch comprises an anti-pick lock device, and means for providing additional securement thereto.

3. Two anti-theft locks in accordance with claim 2 wherein said means for selective rotation of said disk-shaped element comprises key-operated lock means.

* * * * *